Feb. 2, 1960 J. J. BLACK 2,923,384
FLOOR CONSTRUCTION FOR REFRIGERATED ROADWAY VEHICLE
Filed March 11, 1957 2 Sheets-Sheet 1

INVENTOR.
James J. Black.
BY Wood, Herron & Evans.
ATTORNEYS.

Feb. 2, 1960 J. J. BLACK 2,923,384
FLOOR CONSTRUCTION FOR REFRIGERATED ROADWAY VEHICLE
Filed March 11, 1957 2 Sheets-Sheet 2
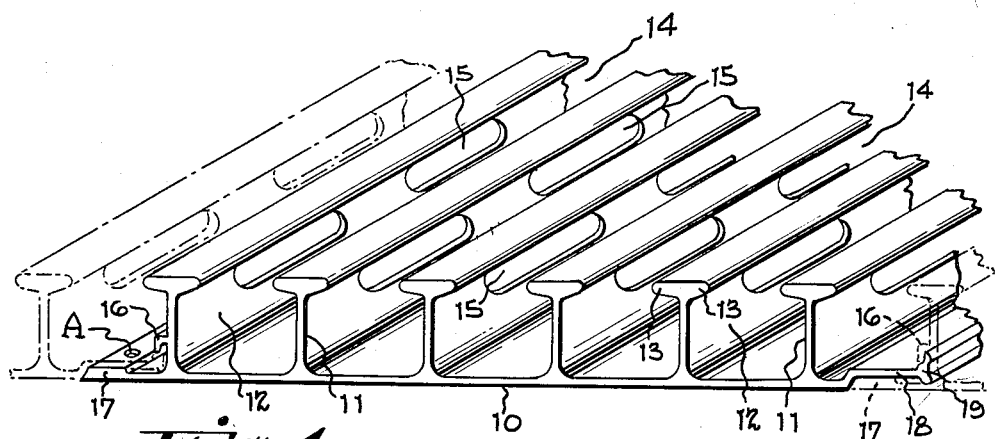
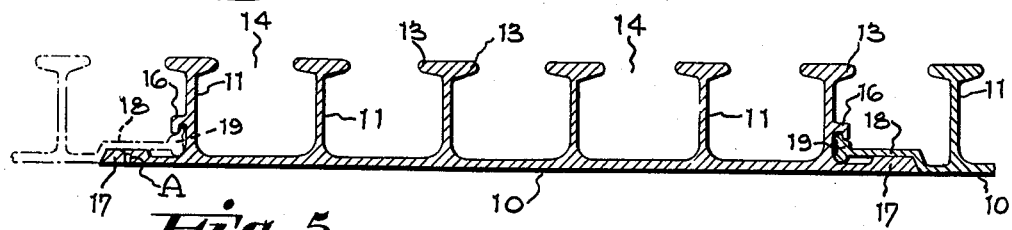
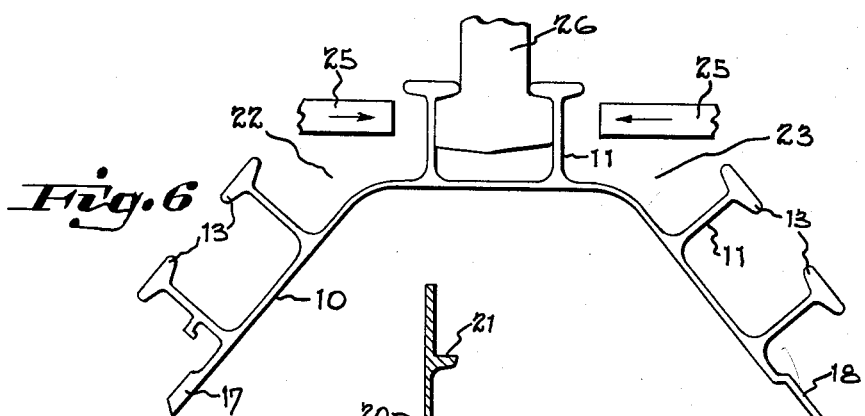
INVENTOR,
James J. Black.
BY Wood, Herron & Evans.
ATTORNEYS.

United States Patent Office 2,923,384
Patented Feb. 2, 1960

2,923,384

FLOOR CONSTRUCTION FOR REFRIGERATED ROADWAY VEHICLE

James J. Black, Cincinnati, Ohio, assignor to Trailmobile, Inc., Cincinnati, Ohio, a corporation of Delaware Application March 11, 1957, Serial No. 645,241

4 Claims. (Cl. 189—34)

This invention relates to truck and trailer vehicles of the refrigerated type, that is vehicles equipped with apparatus for circulating a stream of chilled air over perishable cargo such as foodstuffs or the like while the cargo is being transported.

The principal objective of the present invention has been to provide a vehicle floor system upon which cargo may be supported but through which air may be conducted to or from the refrigerating system.

In the conventional refrigerated type of truck or trailer a power-driven fan discharges air over the expansion coils of a refrigerating system by means of which the air is cooled and is then discharged into the vehicle, usually near the ceiling thereof or above the top of the cargo level. The cold air is intended to flow around the cargo and maintain the cargo at a suitably low temperature. In some instances the cargo is supported on a floor having longitudinally extending channels which respectively communicate with the suction side of the air fan whereby air which has been warmed in passing over the cargo may be circulated to the fan for recooling. In actual practice, systems of this type fall far short of the theoretical expectations; difficulties arise because cargo cannot be loaded into the large floor area of the vehicle with the uniformity of spacing that is requisite to obtain uniformity of air flow or uniformity of cooling over and around the cargo units.

In accordance with this invention, a trailer vehicle is provided with an air circulating floor system, which in and of itself is of nominal height whereby maximum cargo capacity is provided, through the provision of a plurality of vertical webs extending longitudinally of the vehicle from one or more bottom panels which form a primary closure for the bottom of the vehicle body. The webs at their upper extremities have one or more sidewise flanges; these reside in flush relation to one another and constitute a cargo-carrying floor for the vehicle. However, the edges of the flanges are spaced from one another so as to provide slots extending longitudinally of the vehicle. Air filtering over the cargo resting on the floor may pass through the slots (wherever they are uncovered) and into the channelways between adjacent webs, and the ends of the channelways are in communication with the air circulating fan of the refrigerating system.

In addition, however, an important advantage of this invention is based upon the discovery and determination that cargo loaded into the vehicle can be maintained at substantially uniform temperature regardless of the care with which the cargo may be packed into the vehicle by providing slots or apertures at spaced intervals in the webs of the flooring, through which air entering one channelway may flow to and through other channelways in its return to the forced air system.

In respect to refrigerating efficiency, the advantages which the present invention provides can best be understood in relation to the conditions under which cargo requiring refrigeration is loaded into vehicles having floor ducts of conventional construction. When crates or baskets, containing vegetables or oranges for example, are brought into the vehicle, they are placed upon the floor and succeeding layers are placed on top of one another usually in random pattern until the vehicle is fully loaded. Some of the crates may completely cover the individual floor duct openings. At other areas some of the floor duct openings will be accessible to air passing circuitously through the cargo from higher levels.

If it happens, as it frequently does happen, that some of the floor ducts are accessible to air only at points near the circulating fan, the air, following paths of least resistance, will flow unevenly through those areas, short-circuiting the rest of the cargo. In other instances certain of the floor ducts may be open to air flow at points in the vehicle which are distant from the circulating fan, but the duct passageways leading to the circulating fan from such points can only carry so much air volume at the given pressure differential provided by the fan, and the result will be that the air circulating system is relatively starved because of an inadequate return air supply, that is, the ducts to which air can gain entrance are individually too small to carry the air volume necessary to maintain the desired temperature. When this occurs the rate of heat removal from the vehicle interior will fall and the cargo may become spoiled; this is particularly likely to occur if the floor air passageways adjacent the side walls of the vehicle are covered, since the entrance of heat into the vehicle from the exterior will be greatest at the side walls and the need for cooling will accordingly be greatest at those areas.

In accordance with this invention, improved over-all efficiency of the refrigerating system is achieved by providing a floor system including spaced webs as previously described in conjunction with cross apertures in the webs through which air capable of entering any channelway between adjacent webs through some open floor slot portion thereof may flow from that channelway to an adjacent channelway or even to a channelway spaced an appreciable distance from the one it entered, whereby each channelway may function to carry air to the air circulating fan whether the air enters the same directly through an open floor slot portion thereof or indirectly through the web apertures from adjacent channels having open slot portions. Thus, all of the air which is accessible from the circulating fan is readily returned to the refrigerating system. In other words, the pressures at the delivery end of each channelway of the floor, whether negative or positive depending on the type of system used, are equalized, and air entering into the cross communicating floor duct system at any point will find its passage either directly or circuitously through the floor, no matter where it enters the system. In substance, the simple cross passages in the webs have been found to prevent starving of the refrigeration system and to provide against overloading of the channelways in the floor system. If the cargo is loaded into the vehicle in such manner as to provide at least some open slots, even at the very ends of the channelways, it has been determined that enough chilled air will pass over, around, or adjacent the cargo units to maintain all of them at temperatures below the permissible limit of safety.

Even though apertures are provided at spaced intervals in the vertical webs of the floor system, the webs, connected to the bottom panel at their lower extremities and flanged at the top, provide a floor system which is of minimum height but which is strong. In the preferred practice of this invention, the floor for a vehicle is made up of a plurality of floor sections, each made of extruded aluminum for example, which sections are of substantially duplicate configuration in cross section but which have interlocking means at their sidewise longitudinal extremities whereby a plurality of sections may be joined longitudinally with one another to form a continuous floor. Also, since cross apertures cannot be provided in the webs as they are extruded, the section as extruded may be generally semi-circular or inverted V formation so as to dispose the webs radially or angularly with respect to one another whereby space between the webs is provided to permit a suitable tool such as a punch, drill, or end mill to enter each web and pierce the same crosswisely. After the apertures are provided in the webs of a section, the section is then flattened so that the bottom panel is straight and the tops of the flanges of the respective webs are flush with one another, in which condition the section is joined edgewisely to a section similarly fabricated.

A typical embodiment of the present invention is illustrated in the accompanying drawings in which:

Figure 4 is a perspective view showing a floor section of interlocking type adapted for connection with floor sections of similar construction at its longitudinal edges;

Figure 5 is a cross-sectional view of a modified form of floor section;

Figure 6 is a cross-sectional view of a floor section made of extruded aluminum and being of generally inverted V formation in cross section to facilitate piercing of the section webs to provide cross flow apertures therein; and Figure 7 is a cross-sectional view of an adapter section for use at the juncture of the floor system and a vehicle side wall.

Figure 1:
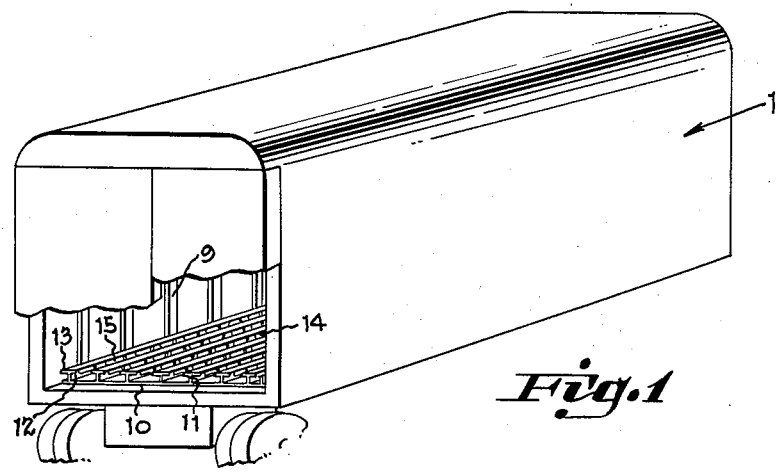
Figure 1 is a perspective view of a trailer vehicle having a floor constructed in accordance with the present invention.
Figure 2:
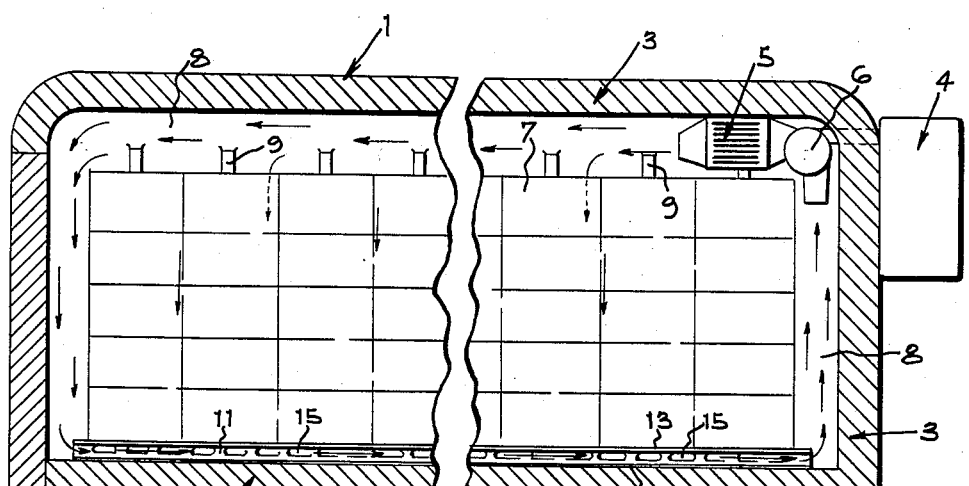
Figure 2 is a somewhat diagrammatic view taken longitudinally through a trailer vehicle equipped with an air cooling system and having a floor constructed in accordance with the present invention.
Figure 3:
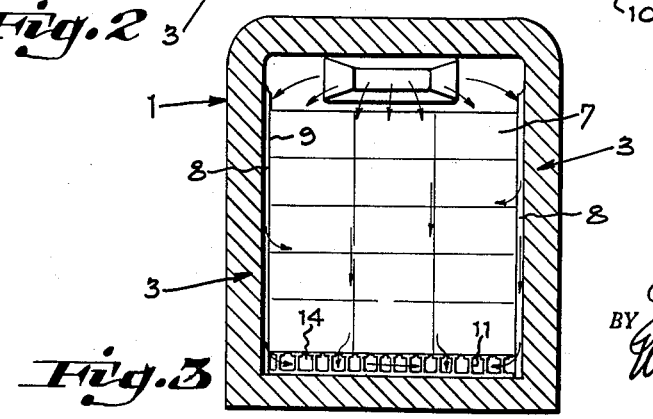
Figure 3 is a view similar to Figure 2 showing the vehicle body in cross section.

The body 1 of the vehicle shown in Figures 1–3 may be of conventional construction, for which reason its details are not herein disclosed. It will be understood that the body is mounted on a wheeled frame or chassis having side channels or longitudinal beams, cross bolsters, or other structural members for supporting the body and the floor thereof. The body of a vehicle intended for refrigeration service usually includes thermal insulation indicated generally at 3 at the walls and roof as well as beneath the load-supporting floor.

In a typical vehicle of refrigerated type, an engine-driven compressor unit, indicated generally at 4, is located in an elevated position at the front end to supply refrigerant to expansion coils indicated generally at 5 over which a stream of air is forced by means of a blower 6 driven from the compressor engine. The fan, usually located near the roof, propels a stream of chilled air over the cargo which is illustrated diagrammatically at 7. The fan 6 is supplied with air from a manifold space 8 located at the front end of the trailer, which may be provided either by a bulkhead or partition or by spacing the front end cargo from the front wall. Similarly, ribs or channels 9 arranged at intervals along the side walls space the cargo from the side walls so as to allow air to flow downwardly along the side walls.

In Figures 2 and 3 the cargo 7 is indicated generally by the cross lines, but it will be understood that perishable cargo of the type requiring refrigeration during transport cannot be stacked in such orderly and compact fashion; for example, round bushel baskets or bulged crates containing vegetables or fruit will inherently have spaces therebetween through which air can move.

In accordance with the present invention, a load-sustaining, air-conductive floor is provided upon which cargo may be loaded but also into and through which air may pass to the fan inlet manifold area 8, not only from the rearmost end of the cargo but at whatever intermediate areas the air under the positive head pressure of the fan discharge and the negative inlet pressure of the fan may filter downwardly through passages in the mass of cargo wherever the cargo units are spaced from one another. This floor system, in the preferred mode of construction, comprises an assembly of individual floor sections. Each section comprises a bottom panel portion 10 having a flat, lower face adapted to be fastened to and supported by structural members of the chassis extending longitudinally or transversely thereof or both. From the bottom panel portion of each section a plurality of webs 11 extend vertically in spaced relationship to one another. The section, by way of example, may be made approximately 12" in over-all width to facilitate extrusion and convenience in handling, or some dimension of approximately the same magnitude which is modular with respect to vehicle width. Each section may extend throughout the length of the vehicle in which it is to be installed or sections of intermediate length may be employed.

The webs 11, spaced from one another, provide channelways 12 extending from one end of the floor system to the other. At their upper extremities, the webs 11 are of T formation, embodying flanges 13, 13 which extend in horizontal direction from opposite sides thereof or from one side only if desired. The upper surfaces of these flanges are flush with one another and constitute the floor on which cargo units may be placed. However, the flanges 13 of adjacent webs terminate short of one another, thereby providing longitudinal slots 14 through which air may enter the channelways 12 from areas above the floor.

It will be seen that the cargo resting upon the flanges 13 of the floor sections will cover many of the slot areas 14, but that air passing through spaces between cargo units in its movement toward the floor will be able to enter any uncovered slot areas of the floor system which are in communication with such spaces either directly or through intermediate passageways in the mass of cargo. At the prevailing air pressure supplied or induced by the fan, each channelway 12 can only carry so much air, and if it happens that cargo is loaded onto the floor in such manner that only a few of the floor slots are accessible to air from the fan, the channelways communicating with other slots will be inactive and the rate of air circulation will be governed by the limited capacity of the lesser number of channelways to which air can pass. Conditions of this type frequently occur adjacent the side walls of the vehicle where the need for cooling air is greatest to conduct away the heat transmitted through the metal structure of the side walls. Some air always will pass over the entire top of the cargo and move to the floor at the rear and return through the channelways to the inlet manifold at the front, but it is desirable to promote the passage of air around the cargo units intermediate the ends from the ceiling to the floor.

To promote air circulation notwithstanding closure of some of the air slots by cargo loaded thereon, the webs 11 of the floor sections are provided with apertures 15 extending therethrough. In the preferred structure the apertures are elongated and are located beneath the flanges 13 of the webs in spaced relationship to one another throughout the lengths of the webs. By this means any channelway which is closed by cargo covering its slots in whole or in part is available to accept or induce air from any channelway which is open to air but which is otherwise loaded to the limit of its air carrying capacity. The negative pressures at the outlet ends of the channelway are equalized and all channelways function to carry air to the fan even though the slots in the floor are open at only certain points or areas. By this means an adequate supply of air to the inlet side of the fan is provided and the efficiency of the refrigerating system is maintained.

From the structural point of view, it is preferred to equip the edges of the floor sections with male and female interlocking flanges through which the sections may be joined to one another in such manner that the bottom panel portions of adjoined sections form a virtually airtight membrane. As shown in Figure 4, the interlocking flange structure along one edge, i.e., the left, comprise a continuous hook portion or cleat 16 extending outwardly, then downwardly, from the outermost web 11 of the section at a level above the bottom panel portion 10, and a ledge portion 17 which forms a continuation of the bottom panel portion of the section, except that it is marginally thicker. The cleat 16 and ledge 17 receive a male interlocking flange of complementary configuration extending from the relatively opposite, i.e., right, edge of a floor section which is to be connected thereto. This is as shown at the right-hand side of Figure 4, wherein a horizontal edgewise flange 18 is offset from the bottom panel portion 10 of the section a distance corresponding to the marginal thickness of the ledge 17. Flange 18 terminates in a vertically disposed longitudinal strip 19. The upper edge of the strip portion 19 is adapted for engagement within the cleat 16 of the adjacent section, and the lower edge of the strip 19 seats at the corner juncture between web 11 and the ledge projection 17 extending longitudinally therefrom.

To assemble and interlock the sections, each may be slid longitudinally onto one adjacent or, as in the arrangement disclosed, the connection can be made by angulating one section laterally to the other so that the upper edge of the longitudinal male strip 19 can be entered, continuously, into the longitudinal cleat 16 of the adjacent section, after which the angulated section may be reclined to the same plane. In either manner, as many sections may be joined as are necessary to provide a floor over the entire floor area of the vehicle. When the sections are in the same plane, the upper surface of the thickened ledge 17 of each rests facially against the lower surface of flange 18 of the adjacent section. Thereby seals are formed which are effective at the normal air pressure provided from the refrigeration system fan to prevent air leakage through the bottom of the floor system to the exterior of the vehicle.

Each floor section may be fastened to structural members of the vehicle in suitable manner. In this respect an advantage is obtained by providing apertures A at spaced, longitudinal intervals in the ledge projections 17 adjacent the female cleats 16 of the sections whereby the disposition of the mating flanges 18 of adjacent sections will conceal the fastenings and provide a tight floor closure. The section shown in Figure 5 is of slightly modified construction. In this instance the section shown in full lines is equipped at each longitudinal edge with female interlocking structure of the type shown at the right-hand side of Figure 4, while adjoining sections are equipped at each edge thereof with male interlocking structure of the type shown in the left-hand side of Figure 4. Floor structure of the modified type requires two different types of extrusion dies to produce the respective male and female types of sections, but an advantage is provided in assembling the floor sections within the vehicle. Thus, a floor board section of the type shown in Figure 5 may first be placed at the center of the floor area of the vehicle, that is, intermediate the sidewise extremities thereof, then floor sections of the type shown in Figure 4 may be arranged at each edge thereof, reversely with respect to one another, and locked thereto, and as many additional floor sections of the type shown in Figure 4 may be laid to complete the flooring.

Where the outermost floor section at each side of the vehicle meets the vehicle side wall, a corner extrusion of the type shown in Figure 7 may be utilized. This comprises a locking structure of the male or female type, as needed to accommodate a section of the type shown in Figure 4 or 5 as the case may be, a wall portion 20 extending vertically from the locking structure, preferably in spaced relationship thereto, and a ledge 21 projecting from the vertical wall portion at a level above the tops of the load-supporting flanges 13 of the floor sections. A horizontal base flange, corresponding to the bottom panel portion 10 of the floor sections, projects outwardly from the wall portion 20 on the side thereof opposite the edgewise flange 18 to facilitate attachment of the corner extrusion to the vehicle chassis, for example at the usual longitudinal frame member thereof. Through the spacing provided by the locking structure, the corner extrusion provides a continuously extending air channelway at the extremity of the floor adjacent the side wall, as well as a slot communicating therewith. Instead of using angle pieces at the outermost longitudinal edges of an assembly of floor sections where the side walls join the floor, the portions projecting outwardly from the outermost webs of the outermost sections may be omitted or removed and the provision of apertures in such webs also may be omitted whereby the outermost webs will then constitute closure walls at the sides of the intercommunicating ductway system therebetween.

Inasmuch as the floor sections utilizing the advantages provided by the present invention are fabricated most conveniently by extrusion, it will be seen that the apertures 15 in the webs 11 thereof have to be provided subsequent to the extrusion, but it will also be seen that the extensions of the flanges 13 from the tops of the webs make the webs relatively inaccessible. However, Figure 6 shows a form of extrusion which facilitates piercing of the webs to provide the cross holes. The section, as extruded, transversely is of circular or truncated V form whereby adjacent webs at the right and at the left diverge arcuately or angularly in opposite directions from one or more webs at the center. Such divergence provides open areas 22 and 23 between the right and left-hand webs or sets of webs and the center web or set. Through these open areas a suitable tool may be applied to pierce the webs, either singly or in sets. For example, a tool such as an end mill 25 may be applied to either of the center webs as shown, or to both at once, to mill elongated apertures 14 therein at spaced intervals, or a drill may be used if round rather than elongated apertures are desired. The operation may be duplicated by subsequently bringing the right and left-hand webs to the tooling. In the alternative, a die 26 may be inserted between the adjacent webs of a set so as to support the webs while punches, also indicated at 25, 25 may be applied simultaneously to the outer faces of the webs of the set.

Although interlocking flanges of different details than the type shown may be used, it will be noted that a vehicle floor made up of sections constructed and assembled in the manner shown is exceedingly strong, both in the longitudinal and lateral directions of the vehicle. The continuous bottom panel portion of each section and the webs of T formation extending therefrom insure against deflection of the floor under load in the longitudinal direction while the interlocking flanges not only facilitate assembly and provide for air sealing but also prevent the sections from spreading or separating in the transverse direction. Thus, because of the integral web and flange structure and the longitudinal interlocking of the sections one to another, a floor system of light-weight but of great strength is provided in an economical manner.

Having described my invention, I claim:

1. A floor section for a vehicle comprising, an extruded aluminum section including a bottom panel portion, a plurality of webs extending transversely from said bottom panel portion in spaced relationship to one another, the said webs having flanges projecting transversely therefrom at their upper ends throughout their length, the said flanges of said webs residing in substantially flush surface relationship to one another but having their edgewise extremities spaced from one another to provide longitudinal slots communicating with the spaces interiorly of said section between said webs, each web having apertures extending therethrough at spaced intervals longitudinally thereof, and means at each sidewise extremity of said section for forming a longitudinally extending interlocking connection with a section of similar bottom panel, web, and flange construction whereby a floor for a vehicle may be assembled by longitudinally interlocking a plurality of such sections, within which floor air may flow through the channelways between adjacent webs and through the apertures in said webs to the channelways between other adjacent webs the apertures in said webs residing beneath the said flanges of said webs but above the said interlocking means.

2. Floor structure for a roadway vehicle comprising, a plurality of relatively narrow elongated sections assembled in side-by-side relation to constitute a floor for the entirety of the vehicle, each section comprising a metal extrusion including a bottom panel portion adapted to be supported by the chassis of the vehicle, a plurality of webs extending upwardly in vertical direction from the bottom panel portion in spaced relationship to one another, each web at its upper extremity having a flange extending outwardly from both sides thereof, the width across the flange of each web being less than the spacing of the webs whereby slots communicating with the spaces between the webs are provided between the flanges of adjacent webs, the upper surface of the said flanges residing substantially in a plane which is parallel to the plane of said bottom panel portion, and each of the said webs having apertures extending therethrough whereby air may flow from the channelway between adjacent webs to a channelway between other adjacent webs of the section, and continuously extending means at the outer longitudinal edges of the sections interlocking the bottom panel portions thereof to one another the said apertures in said webs residing beneath the said flanges of said webs but above the said continuously extending interlocking means.

3. A floor section for a vehicle comprising, an extruded aluminum section including a bottom panel portion, a plurality of webs extending transversely from said bottom panel portion in spaced relationship to one another, the said webs having flanges projecting transversely therefrom at their upper ends throughout their length, the said flanges of said webs residing in substantially flush surface relationship to one another but having their edgewise extremities spaced from one another to provide longitudinal slots communicating with the spaces interiorly of said section between said webs, each web having apertures extending therethrough at spaced intervals longitudinally thereof, and means at each sidewise extremity of said section including a web at at least one side of said section for forming a longitudinally extending interlocking connection with a section of similar bottom panel flanged web construction whereby a floor for a vehicle may be assembled by longitudinally interlocking a plurality of such sections, within which floor air may flow through the channelways between adjacent webs and through the apertures in said webs to the channelways between other adjacent webs, the apertures in said webs residing beneath the said flanges thereof but above the said interlocking means.

4. Floor structure for a roadway vehicle comprising, a plurality of relatively narrow elongated sections assembled in side-by-side relation to constitute a floor for the entirety of the vehicle, each section comprising a metal extrusion including a bottom panel portion adapted to be supported on the chassis of said vehicle, a plurality of webs extending upwardly in vertical direction from the bottom panel portion in spaced relationship to one another, each web at its upper extremity having a flange extending outwardly from both sides thereof, the width across the flange of each web being less than the spacing of the webs whereby slots communicating with the spaces between the webs are provided between the flanges of adjacent webs, the upper surface of the said flanges residing substantially in a plane which is parallel to the plane of said bottom panel portion, each of the said webs having apertures extending therethrough whereby air may flow from a channelway between adjacent webs to a channelway between other adjacent webs, and continuously extending means at the outer longitudinal edges of the sections interlocking the bottom panel portions thereof to one another, the said continuously extending interlocking means including the outermost web of at least one section of each adjoining pair, the said apertures in said webs residing beneath the said flanges thereof but above the said continuously extending interlocking means.

References Cited in the file of this patent

UNITED STATES PATENTS

| | | |
|---|---|---|
| 1,178,114 | Westlake | Apr. 4, 1916 |
| 2,231,208 | Crede | Feb. 11, 1941 |
| 2,478,993 | Wing | Aug. 16, 1949 |
| 2,584,916 | Poux | Feb. 5, 1952 |
| 2,680,902 | Amico | June 15, 1954 |
| 2,696,086 | Jones | Dec. 7, 1954 |
| 2,753,018 | Curell | July 3, 1956 |
| 2,786,556 | Constance | Mar. 26, 1957 |

FOREIGN PATENTS

| | | |
|---|---|---|
| 433,558 | Great Britain | Aug. 16, 1935 |
| 677,559 | Great Britain | Aug. 20, 1952 |